United States Patent [19]

Lechuga

[11] Patent Number: 5,055,334
[45] Date of Patent: Oct. 8, 1991

[54] HEAT PROTECTIVE COVER FOR HOT WATER PIPES

[76] Inventor: Gabriel V. Lechuga, 67365 Verona Rd., Cathedral City, Calif. 92234

[21] Appl. No.: 427,026

[22] Filed: Oct. 26, 1989

[51] Int. Cl.⁵ .......................... F16L 59/16; B32B 3/06
[52] U.S. Cl. ..................................... 428/99; 428/100; 428/192; 150/154; 150/901; 138/149; 137/375
[58] Field of Search ..................... 428/99, 100, 192; 138/149, 32; 137/375; 150/901, 156, 154

[56] References Cited

U.S. PATENT DOCUMENTS

| | | | |
|---|---|---|---|
| 3,589,971 | 6/1971 | Reed | 150/901 |
| 4,142,565 | 3/1979 | Plunkett | 428/100 |
| 4,400,420 | 8/1983 | Bakken et al. | 428/100 |

*Primary Examiner*—Alexander S. Thomas
*Attorney, Agent, or Firm*—Robert J. Schaap

[57] ABSTRACT

A flexible heat protective cover adapted for disposition around and securement to hot water pipes in order to provide both heat insulating qualities and to protect an individual from coming into contact with a hot water pipe. The heat protective cover generally comprises an elongated section adapted to extend around a length of pipe and a heel section adapted to extend over an elbow fitting in a water line. Velcro fasteners or similar fastener are used to releasably secure ends of the cover about the pipe. A strap extends through opposite sides of the heat protective cover and is sized to extend about a water pipe for providing permanent securement of the heat protective cover to the hot water pipe. A seepage hole may also be included in the heel section to collect and permit drainage of condensed water.

6 Claims, 4 Drawing Sheets

HEAT PROTECTIVE COVER FOR HOT WATER PIPES

BACKGROUND OF THE INVENTION

1. Field of the Invention

This invention relates in general to certain new and useful improvements in heat protective covers for hot water pipes, and more particularly to heat protective covers which are adapted for a relatively permanent securement about pipe and elbows and which eliminate conventional wrapping by use of tape and the like material.

2. Brief Description of the Prior Art

In many cases, and particularly in public buildings, it is necessary to provide some mechanism to preclude people from inadvertently contacting hot water pipes. This is particularly true in the case of handicapped people who must use wheelchairs or who must lean against a sink or similar plumbing fixture for support when using the sink or like fixture. Hot water supply lines and drainage pipes which may carry the hot water from the sink are located in a position where they are particularly capable of being contacted by people in wheelchairs. These handicapped parties oftentimes will attempt to move a wheelchair under a portion of the sink and in so doing, bring their legs into contact with a hot water pipe. Inasmuch as the handicapped person in a wheelchair is not capable of extricating himself very quickly, serious burns can result.

Due to these problems, there have been various governmental code requirements in which public facilities are required to provide some type of insulation about the hot water pipe and the drainage pipe which may carry waste hot water. In order to comply with these requirements, there has been a resort to wrap the hot water lines with tape which purportedly has some heat insulating qualities. However, the tape usually turns out to be a very poor heat insulator and hence, does not provide an adequate amount of protection. Even moreso, after a short period of time, the tape deteriorates and unwinds from the pipe.

U.S. Pat. No. 4,112,967 to Withem discloses a waterproof insulated valve cover which is adapted to extend around a portion of a valve. In like manner, U.S. Pat. No. 4,556,082 to Riley et al. discloses a cover which is adapted to extend about a valve or a similar fitting in a water pipe. A similar structure, except for use with a beverage container, is taught in U.S. Pat. No. 4,401,245 to Zills. U.S. Pat. No. 4,142,565 to Plunkett, Sr. disclosed any insulating device which extends around fluid conduit. U.S. Pat. No. 4,459,333 to Murphy discloses a similar pipe insulation product which is adapted to extend about a fluid transporting pipe.

A heat insulative and heat protective cover, somewhat similar to the claimed heat protective cover of the present invention has been used for more than one year prior to the filing of this application, as hereinafter described. However, that heat protective cover had several disadvantages which has been overcome by the present invention.

OBJECTS OF THE INVENTION

It is, therefore, one of the primary objects of the present invention to provide a heat protective cover for use with hot water pipes and which is capable of being permanently secured about a pipe.

It is another object of the present invention to provide a heat protective cover of the type stated which includes one or more securement straps for permanently securing the heat protective cover about a pipe or about a hot water line.

It is an additional object of the present invention to provide a heat protective cover of the type stated in which a strap is secured through holes in the cover adjacent to seam in order to eliminate the need for grommets therefor.

It is a further object of the present invention to provide a heat protective cover of the type stated which can be manufactured at a relatively low cost and which is highly efficient in operation.

With the above and other objects in view, my invention resides in the novel features of form, construction, arrangement and combination of parts presently described and pointed out in the claims.

BRIEF SUMMARY OF THE INVENTION

As indicated previously, a heat protective cover for hot water pipes, which is somewhat similar to that described in the present invention has been used more than one year prior to the filing of this application. That heat protective cover was similar to the heat protective cover as hereinafter described, but it did not include any strap for permanently securing the heat protective cover to a hot water line. Accordingly, there was no means for extending a strap through the material forming part of the heat protective cover. In addition, there was nothing in that heat protective cover to permit the draining of condensed water.

The present invention provides a heat protective cover which is adapted to extend around a length of hot water pipe and perhaps an elbow associated with that hot water pipe. The heat protective cover is double-layered and includes an inner heat insulating layer and a thick but flexible outer layer which provides protection to the heat insulating layer. The heat insulating cover is in the form of a jacket formed of two outer jacket sections which are adapted to lie in facewise engagement with one another and in marginal registration.

The outer margin of each of these jacket pieces are secured together by a line of stitching. Opposite margins are provided with releasable fastener strips such as Velcro strips. In this way, the heat protective cover forms a jacket which can extend about a pipe and can be releasably secured thereto. Further, the jacket can be removed, if desired.

Many governmental regulations require the heat protective cover to be permanently secured in order to avoid theft and vandalism. For this purpose, the heat protective cover of the present invention is provided with one or more securement straps. These securement straps extends through the two jacket sections and closely adjacent to reinforcing beads of material which are located along the marginal edges of the jacket sections adjacent the Velcro strips or other fastener strips. These straps can be permanently wrapped about the pipe and thereby permanently secure the heat protective cover to the pipe. Inasmuch as the strap is extended through openings punched through the sheet material in the two jacket sections immediately adjacent these beads, there is no need for grommets. Any tension or pulling forces which are imposed upon the strap only bear against the reinforced beaded sections and therefore, there is no need for grommets, which would otherwise substantially increase the cost of manufacture and hence the overall price of these heat protective covers.

The heat protective cover of the present invention is also formed with a heel section, that is, an outwardly enlarged section which is adapted to extend about a pipe elbow. A small drainage opening is located on the line of stitching at this elbow and permits drainage of any condensed water which may otherwise collect in the heat protective cover.

This invention possesses many other advantages and has other purposes which may be made more clearly apparent from a consideration of the forms in which it may be embodied. These forms are shown in the drawings forming a part of and accompanying the present specification. They will now be described in detail for the purposes of illustrating the general principles of the invention, but it is to be understood that such detailed description is not to be taken in a limiting sense.

BRIEF DESCRIPTION OF THE DRAWINGS

Figure 1:
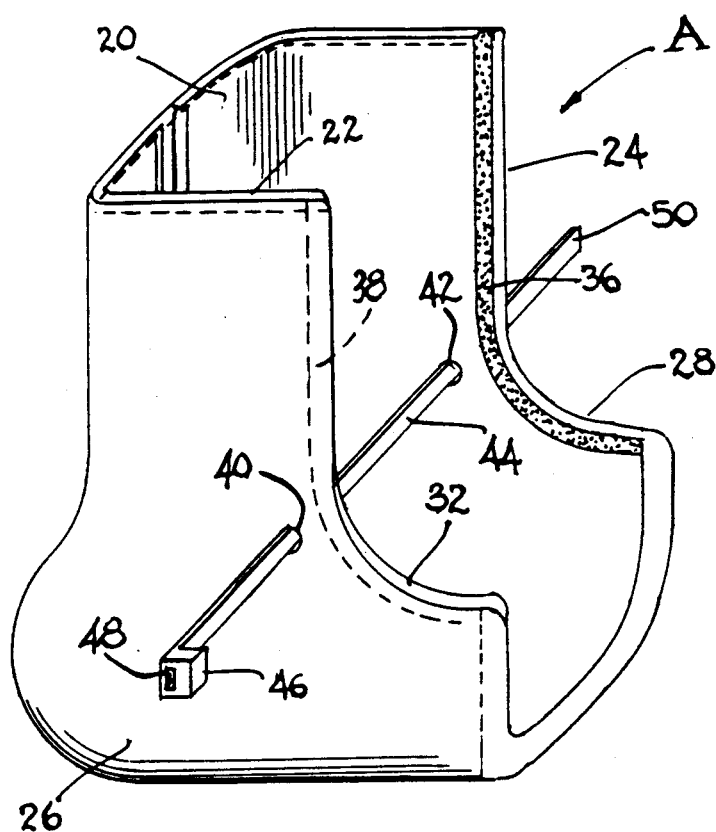
Figure 2:
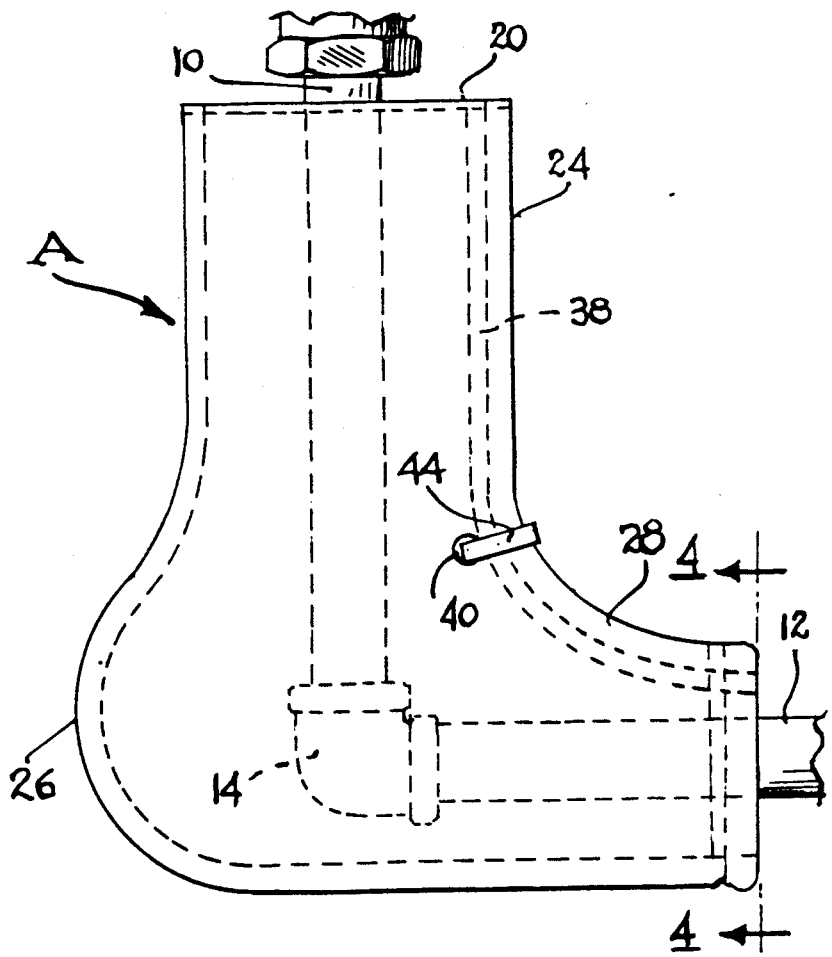
Figure 3:
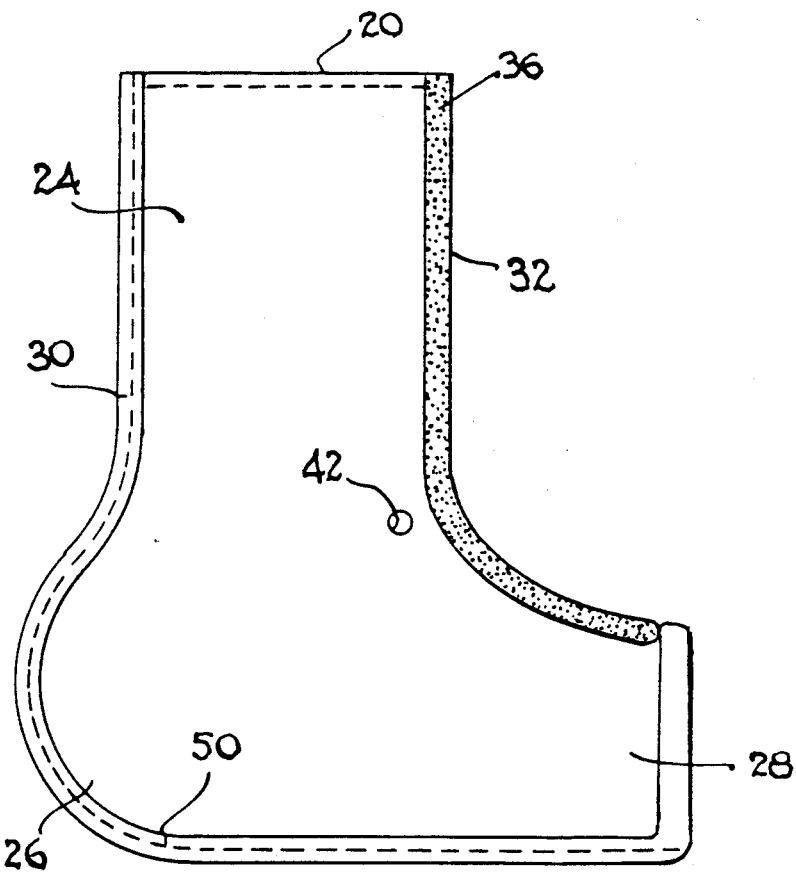
Figure 4:
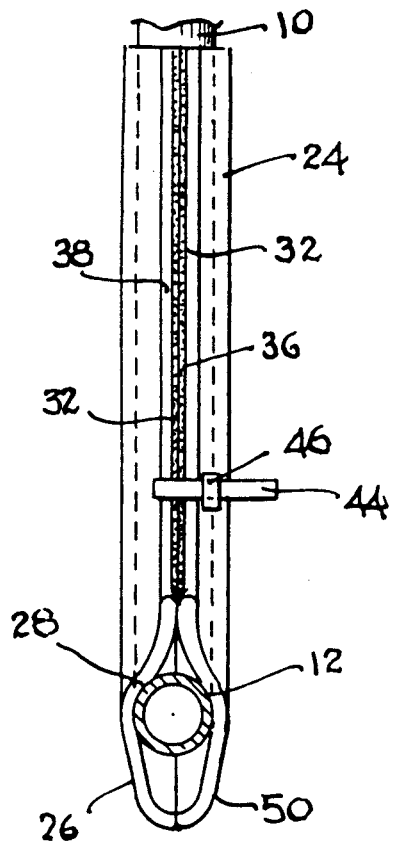
Figure 5:
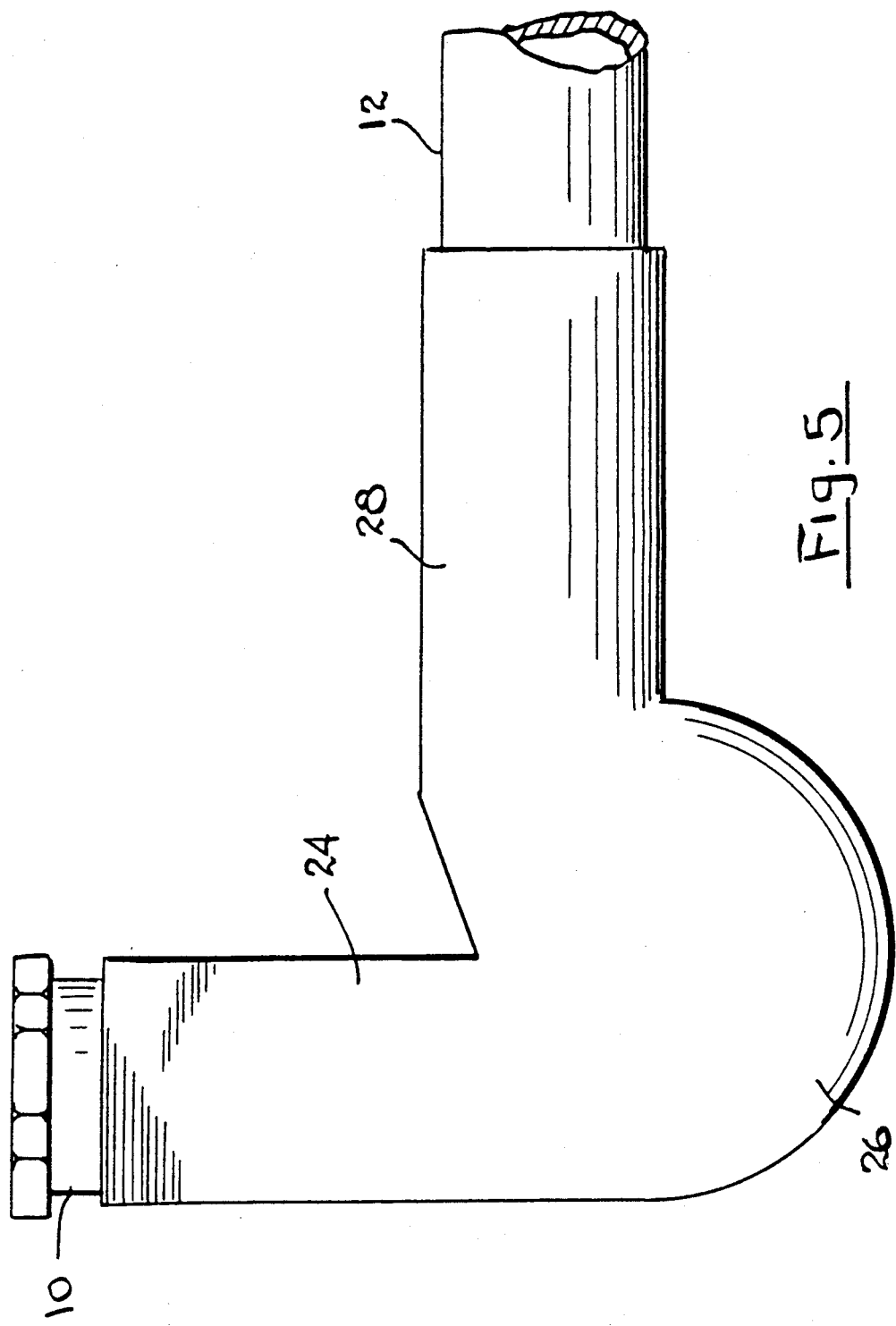
Figure 6:
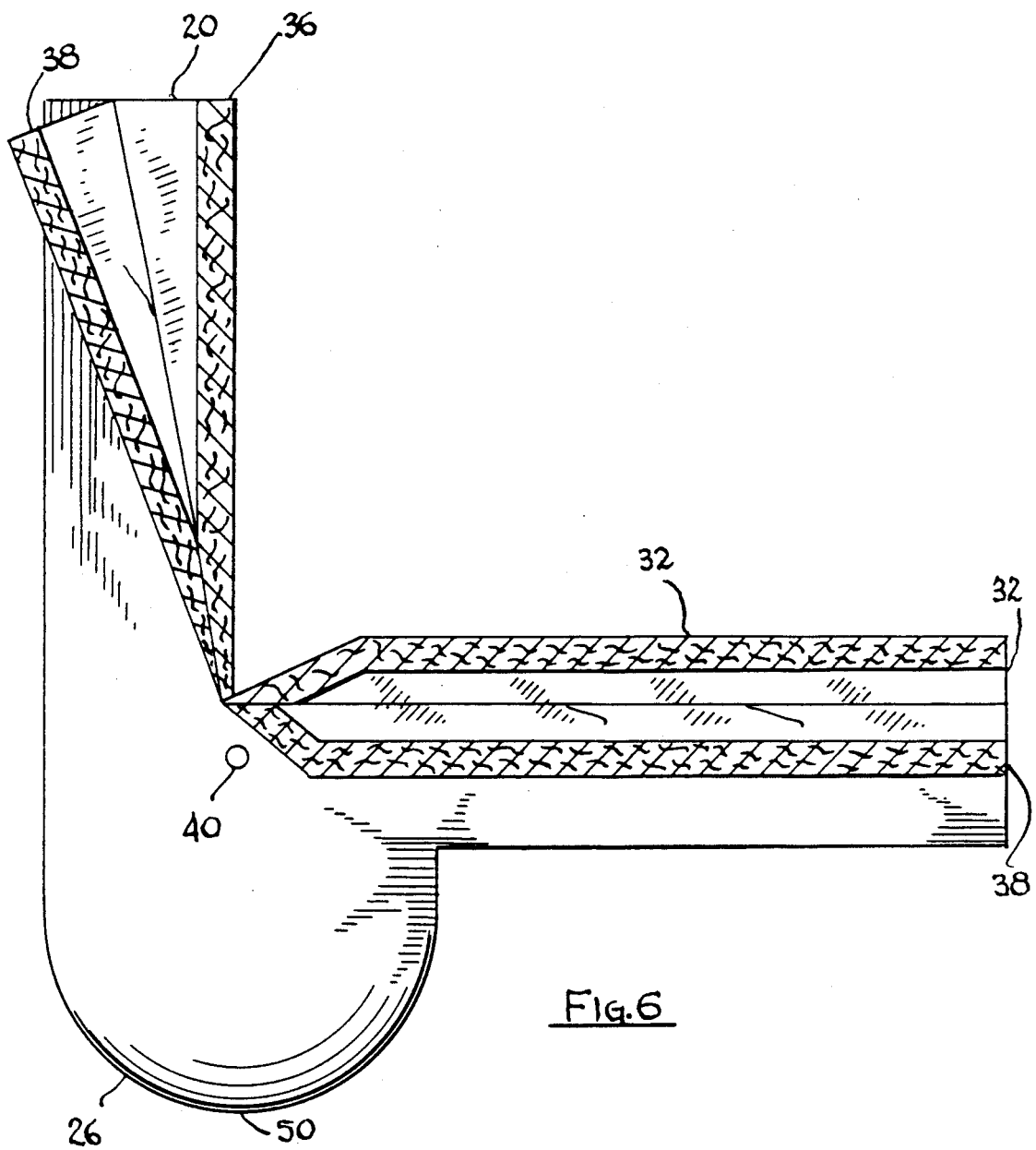

Having thus described the invention in general terms, reference will now be made to the accompanying drawings in which:

FIG. 1 is a perspective view of a heat protective cover constructed in accordance with and embodying the present invention;

FIG. 2 is a side elevational view, and showing a portion of the heat protective cover about a pipe section;

FIG. 3 is a fragmentary vertical sectional view showing one jacket section or panel of the heat protective cover of the present invention;

FIG. 4 is a vertical sectional view showing the heat protective cover about a portion of a hot water line taken along line 4—4 of FIG. 2;

FIG. 5 is a side elevational view of a slightly modified form of a heat protective cover constructed in accordance with and embodying the present invention; and FIG. 6 is a side elevational view, showing the heat protective cover of FIG. 5 partially open.

DETAILED DESCRIPTION OF A PREFERRED EMBODIMENTS

Referring now in more detail and by reference characters to the drawings which illustrate practical embodiments of the present invention, A designates a heat protective cover for disposition over hot water lines. The heat protective cover A is illustrated as extending over a vertically extending pipe 10, and a horizontally extending pipe 12, connected by an elbow 14, as illustrated.

The heat protective cover A is comprised of a first panel 20 and a second panel 22, each of which generally form an L-shaped jacket in construction. In this case, the panels 20 and 22 form an elongate leg 24 and a heel section 26 which open into a relatively short leg 28. The exact shape and size of the heat protective cover may be varied depending upon the end use and the desired application.

The two panels or jacket sections 20 and 22 are stitched along their outer margins by means of a line of stitching 30. Their opposite margins are turned in in order to form reinforcing beads 32. It can be seen that these reinforcing beads extend along each of the panels 20 and 22 for the length of the leg 24 and the length of the leg 28.

Each of the panels 20 and 22 are preferably formed of a pair of layers, as for example, an inner layer which is a heat insulating layer and may be formed of any suitable heat insulating material. These panels are each formed of an outer layer which may be in the form of a fairly thin but yet highly durable plastic material, which is flexible, but provides for sufficient strength and has a neat and clean looking appearance.

Where the two panels 20 and 22 are secured together by a line of stitching 30, they form a jacket which is capable of being disposed around an L-shaped pipe, as best illustrated in FIGS. 2 and 4. However, and as indicated above, the heat protective cover may be formed in various sizes and shapes. In each case, the heat protective cover is provided with releasable securement fasteners.

In the embodiment of the invention as illustrated, the releasable fasteners adopt the form of Velcro type fastener straps 36 and 38, one on each of the opposed panels 20 and 22. Thus, when the two strips 36 and 38 are brought together and in contact with one another, they will automatically fasten providing a self-gripping fastening action. The one Velcro band 36 is provided with outwardly extending, closely spaced fibers. These fibers are capable of snuggling but nevertheless removably engaging other fibers on the band 38. Generally the fiber is formed of plastic materials such as nylon, polyesters or the like. In the preferred embodiment of the present invention, the fibers on the band 38 may be in the form of hook-type fastening fibers and the fibers on the band 36 may be in the form of loop-type fastening fiber in such a manner that the loops formed by the fibers will engage and retentatively hold the hook fibers. This type of Velcro fastener is more fully described in U.S. Pat. No. 3,000,384 and in U.S. Pat. No. 3,387,341.

In a preferred aspect of the present invention, 6.5 millimeter monofilament nylon is used in the form of the raised and staggered loops with approximately a 1/16th inch salvage along both edges of the band. The loops are cut in alternate directions and generally provide a concentration of four hundred or more hooks per square inch. However, other forms of hooks may be employed and the monofilament size may differ depending upon the particular embodiment of Velcro fasteners or other fiber fasteners which are used.

As indicated previously, and to this extent described, the heat protective cover has been used previously. However, the heat protective cover was susceptible of being removed unauthorizedly from pipe. The present invention provides a pair of aligned openings 40 and 42 in each of the panels forming part of the heat protective cover. These openings are formed almost immediately adjacent to the fastener bands 36 and 38, as best illustrated in FIGS. 1 and 3 of the drawings. Moreover, it can also be observed that these fastener bands 36 and 38 are immediately adjacent to the beads 32.

When the heat protective cover is installed about a hot water line, as illustrated in FIG. 2, a securement strap 44 is extended through the openings 40 and 42. This securement strap may preferably be in the form of a cable tie. One type of cable tie which is highly effective is made by Minnesota Mining and Manufacturing Company. In one of the more preferred embodiments of the present invention, the cable tie or securement strap has a length ranging from seven to eight inches and also had a width of about three-eights inches. The cable tie has a so-called buckle 46 at one end which is provided with an opening 48. The opposite end 50 of the cable tie or securement strap is inserted through the opening 48. This type of cable tie is designed to receive the end 50 of the strap in only direction. Thus, once inserted into the opening 48, the strap is locked in that opening and cannot be pulled therefrom. Thus, the securement strap 44 provides for a permanent securement of the heat protective cover upon a hot water line.

It can be observed that while the securement strap 44 precludes removal of the heat protective cover from the pipe, it does not have to be tightened completely. In this way, the Velcro strips can be opened and separated to move the heat protective cover in order to obtain an optimum fitting position on the hot water line.

As indicated previously, the openings 40 and 42 are immediately adjacent to the Velcro strips 36 and 38 which are again adjacent to the reinforcing beads 32. Thus, it has been found in connection with the present invention that it is not necessary to employ grommets around the openings 40 and 42. Any tension or pulling forces imposed upon the securement straps 44 will bear against the Velcro strips and the beads which are fairly strong by virtue of their construction. Hence, in accordance with this construction, it is not necessary to employ grommets which would materially add to the overall cost of manufacturing and hence to the overall cost of the heat protective cover.

The heat protective cover of the present invention is only shown with one securement strap. However, it should be understood that two or more securement straps may be provided along the length of the heat protective cover. Thus, one heat protective strap could be located at the leg 28 and the other could be located at the leg 24.

The heat protective cover is also provided with a drainage opening 50. This opening is effective in order to permit drainage of condensed water which would otherwise accumulate within the heat protective cover.

The outer layer of each of the panels may be formed of cotton with a silicon coating. This allows for easy cleaning. The inner layer is formed of a thermal-insulation type material which reduces heat transfer. The self-gripping fasteners are Velcro-brand material fasteners as indicated above. The line of stitching 30 is preferably formed with nylon thread inasmuch as this material is mildew resistent and constitutes a strong heavy-duty cord.

The heat protective covers of the present invention are ideal in terms of providing future maintenance and provide a permanent insulating device. Moreover, it is highly effective as a safety feature and enables compliance with government codes. In addition, it is very easily and quickly installed.

FIGS. 5 and 6 illustrate a slightly modified form of heat protective covering which may also be used in accordance with the present invention. Like reference numerals appearing in FIGS. 1-4 and in FIGS. 5-6 represent similar components. In this case, the heat protective cover has a much larger elbow section. Nevertheless, it is also highly effective for being permanently secured about pipes in the same manner as the heat protective cover illustrated in FIGS. 1 through 4.

Thus, there has been illustrated and described a unique and novel heat protective cover for hot water pipes which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by letters patent is:

1. A heat protective cover for hot water pipes which can extend about and which can be releasably and also permanently secured to a hot water pipe, said protective cover comprising:
    a) a jacket comprised of a pair of jacket sections which are capable of being disposed about and completely surround a section of a hot water line,
    b) said jacket having a pair of marginal edges which are adapted to lie in marginal engagement when disposed about and enclosing a section of a hot water line,
    c) a releasable self-gripping fastening means associated with the edges of said jacket in order to releasably fasten the edges of said jacket together about the enclosed section of the hot water line, and
    d) a securement strip extending through openings in both sections of said jacket and adapted to be secured to itself to thereby and permanently secure the protective cover to the hot water line.

2. The heat protective cover of claim 1 further characterized in that said releasable self grippening fastenting means comprises a pair of fastening strips with one strip on one jacket and an opposite strip on the opposite jacket section.

3. The heat protective cover of claim 2 further characterized in that reinforcing beads are formed along the margins of the two jacket sections adjacent the fastener strip.

4. The heat protective cover of claim 1 further characterized in that the openings which receive the securement strips are located immediately adjacent to the fastener strips.

5. The heat protective cover of claim 1 further characterized in that said cover is provided with an elongate section and a heel section.

6. The heat protective cover of claim 5 further characterized in that drainage opening is formed in said heel section.

* * * * *